Figure 1:
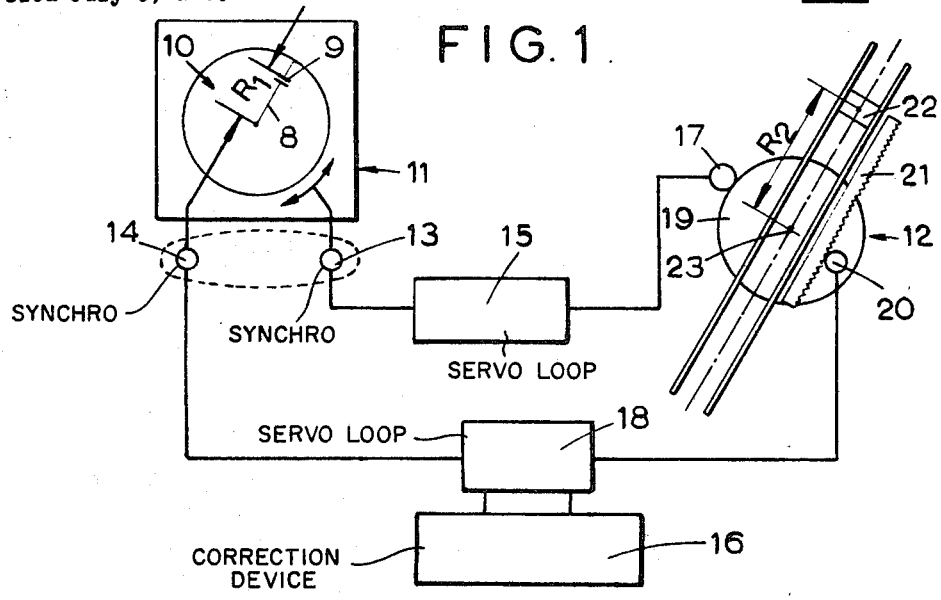

INVENTOR
JOSEPH REGINALD PARRISH
BY
Shoemaker and Mattare
ATTORNEYS

INVENTOR
JOSEPH REGINALD PARRISH
BY
Shoemaker and Mattare
ATTORNEYS

United States Patent Office 3,423,751
Patented Jan. 21, 1969

3,423,751
POSITION PLOTTING APPARATUS FOR USE WITH RADAR OR OTHER POSITIONAL INFORMATION SYSTEMS
Joseph R. Parrish, Richmond, England, assignor to Parrish Instruments Limited, Richmond, England, a British company
Filed July 8, 1963, Ser. No. 293,515
U.S. Cl. 343—5   5 Claims
Int. Cl. G01s 9/00

This invention relates to position plotting apparatus for use with radar or other positional information systems and has more especial reference to apparatus for transmitting information from a radar screen to an automatic plotting device such as that described in patent specification No. 3,072,908.

The present invention provides a self-contained device for detachable fitment to existing radar consoles and in particular plan presentation indicator (p.p.i.) equipment.

An important feature of the device is the inclusion of means for interposing control on the information picked off the radar screen to correct it for non-linearities in the range measurement of the display on such screen.

Broadly stated, the apparatus according to the invention comprises an optical projection system capable of superimposing an image on selected portions of the picture on the radar screen, such image being determined by two co-ordinates, one in azimuth and one in range, in combination with a repeater mechanism capable of reproducing the particular co-ordinates, e.g. at the plotting device of specification No. 3,072,908.

The selection is conveniently effected by rotating manually operated rings coupled to the optical system, one geared to azimuth and the other to range.

The repeater mechanism includes control transformers or synchros or other servo-mechanism for transmitting the positional information from the self-contained device attached to the screen, to the plotting device.

The range servo loop may include a cam or cams interposed between the optical system and the transmitting synchro, the function of which is to rotate the transmitting synchro in such manner that errors due to non-linearities in the radar range presentation are completely compensated. Further, by having two or more cams, radar pictures to several scales may be transmitted and reproduced to a common scale in the plotting apparatus by transferring the synchro control from one cam to another avoiding the necessity of providing complicated gear change mechanism.

In a preferred embodiment of apparatus according to the invention, a frame for an optical system is adapted to be detachably mounted in front of a radar screen, preferably with the axis of the system perpendicular to the axis of the radar screen.

A suitable light source is located in a central cavity of the apparatus and through a condenser illuminates a suitable image which is projected on to the radar screen by a lens system and a half-silvered mirror, through which mirror an operator may observe the image projected on to the screen and bring it into co-incidence with any selected portion of the picture thereon.

A suitable image to enable bearing and range of a target on the screen to be quickly and conveniently selected for transmission to the plotting apparatus consists of a line which extends radially from the centre of the radar screen to its outside edge and can be rotated to determine bearing. This image is derived from a slide with a suitable light slit which can be controlled to move in a radial direction in such manner that a small break or suitable mark in the line may be made to move from the centre of the screen to the outer periphery under control of the operator for range.

Control is derived from a pair of manually rotatable rings, one rotating the optical system for azimuth and the other ring displacing the slide in a radial direction for range.

A gear train coupling the manual control ring for azimuth includes a synchro forming part of a servo loop to the plotting apparatus by which the azimuth setting is repeated at the plotting apparatus.

Rotation of the lower manually rotatable ring causes a radial displacement of the slide and thereby the position of the range marker on the screen and simultaneously rotates a bank of cams, each cam corresponding to a particular radar scale.

Rotation of the range synchro is controlled by the rise and fall of a lever bearing on the selected cam, the contour of which is so shaped that the synchro rotation represents a true corrected range for transmission to the plotting device.

When the operator has manipulated the rotatable rings to superimpose the range and bearing marker over the radar target, this setting being automatically repeated at the plotting apparatus, the appropriate record may be printed, e.g., as described in he aforementioned specification No. 3,072,908.

It will be appreciated that individual peculiarities in range determination of different radar equipment may be fully compensated by suitably shaping the range controlling cams.

Figure 2:
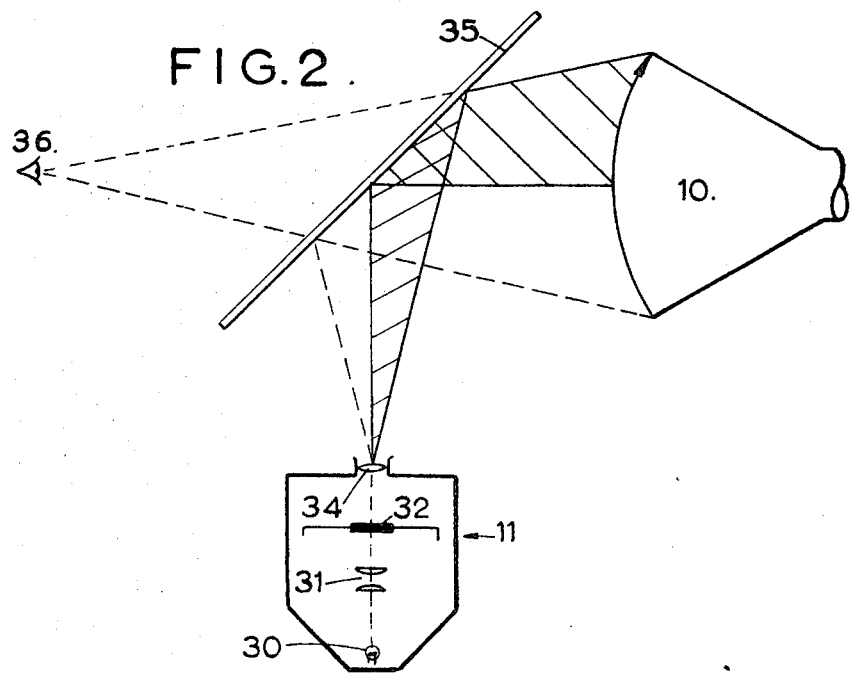
Figure 3:
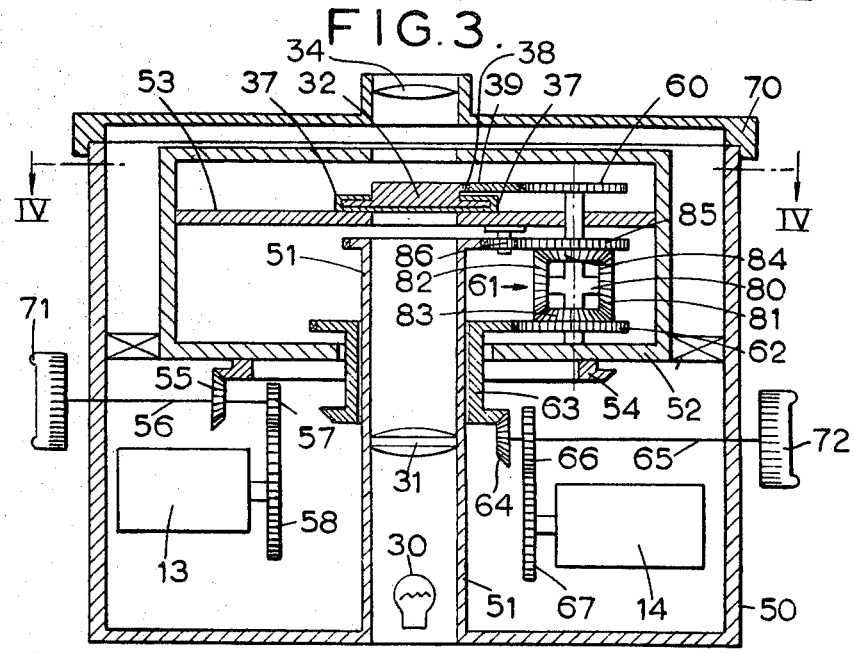
Figure 4:
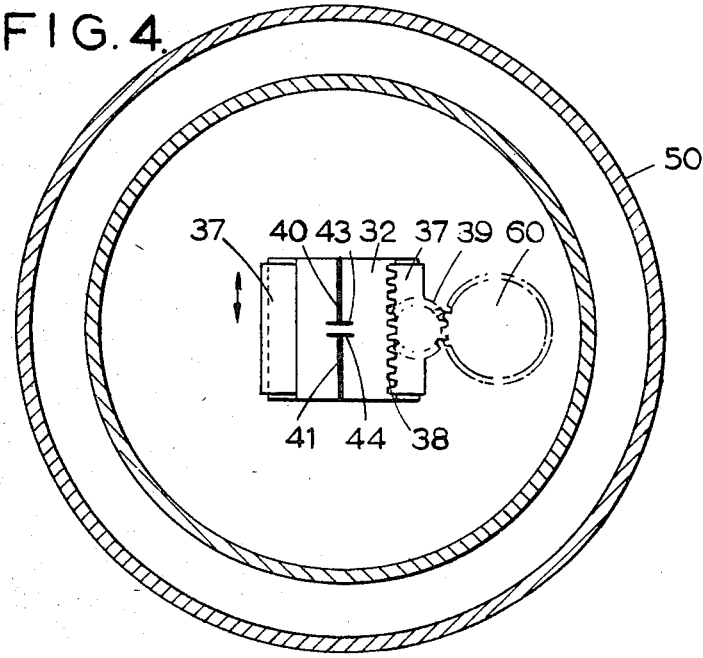

A preferred embodiment of the invention is shown by way of example in the accompanying drawings in which:

FIGURE 1 is a schematic layout showing the relative positions of the components, FIGURE 2 is a diagram showing how an image may be superimposed up on a radar display tube, FIGURE 3 is a cross sectional view of a projector device according to the invention, and FIGURE 4 is a view taken on the line IV—IV of FIGURE 3.

Referring first more particularly to FIGURES 1 and 2, 10 generally designates a radar display tube and 11 generally designates a projector according to the invention adapted to project an image on to the tube 10 and to transmit positional information to a repeater generally designated 12.

In FIGURE 1, the image preferably comprises one or more lines of light 8 which through the medium of the projector 11 can be rotated in azimuth under the control of the operator to indicate bearing. The line 8 has a small break 9 which can be moved in a direction radially of the display tube 10 between the centre and the periphery through the medium of the projector 11 under the manual control of the operator, its distance $R_1$ from the centre corresponding to range.

Such manual control by the operator is effective to activate a pair of synchros 13 and 14 responsive to change of bearing and to change of range respectively as will be hereafter described.

The azimuth synchro 13 will form part of a servo loop generally designated 15, arranged to control drive motor means generally designated 17 for rotating a wheel 19 in azimuth at the repeater 12.

The range synchro 14 forms part of a servo loop generally designated 18, which includes a correction device 16, and is arranged to control drive means generally designated 20 for a rack 21 at the repeater 12.

The rack 21 is arranged for longitudinal sliding movement on the wheel 19 and is adapted to move a printing head 22 radially of the wheel 19.

When the wheel 19 is rotated under the control of the azimuth servo loop, the printing head 22 will rotate in azimuth about the centre 23 of the wheel 19 and the azimuth servo loop will provide that such movement will maintain the printing head 22 in sympathy with the position line of light 8 on the radar display tube 10.

Movement of the rack 21 under the control of the range servo loop will effect movement of the printing head 22 radially outwardly or inwardly of the wheel 19 to reproduce a range $R_2$ at the repeater 12 in sympathy with variation of the radial distance $R_1$ defined by the image projected on to the radar display tube 10.

Referring now to FIGURE 2, 10 again represents a radar display tube and 11 designates an optical projector according to the invention.

In each projector, 30 represents a light source, 31 is a condenser lens system, while 32 represents an image plate having slits allowing light to pass through it. 34 is an enlarger lens anr 35 is a half-silvered mirror. As shown, light from the source 30 which passes through the slits in the image plate 32 will be reflected by the half-silvered mirror 35 on to the display tube 10. The fact that the mirror 35 is half-silvered will enable the tube 10 to be viewed through such mirror from the direction indicated by the eye 36.

As will be seen from FIGURE 4 the slits in the image plate 32 are in the form of two aligned slits 40 and 41 and in the gap between them are two parallel slits 43 and 44, the remainder of the plate 32 being non-translucent.

The slits 40 and 41 will produce the transient radial lines of light 8 on the display tube 10. The slits 43 and 44 will produce two parallel lines of light which will define the gap 9 on the tube 10.

Referring also to FIGURE 3 it will be seen that the plate 32 is mounted to slide longitudinally in guides 37 and is provided with a rack 38 driven by a pinion 39.

50 is a housing for the projector and 51 is a central tube in which are mounted the light source 30 and the condenser 31.

70 is a cap mounting the enlarger lens 34.

Carried for rotation about the tube 51 within the housing 50 is a cage 52 provided with a platform 53 carrying the guides 37. Fixed to the cage 52 is a toothed wheel 54 engaged by a pinion 55. The pinion 55 is mounted on a shaft 56 which also carries a toothed wheel 57 engaging a further wheel 58 connected to drive the synchro 13.

The shaft 56 can be rotated manually suitably by a milled handwheel 71 in either direction to rotate the pinion 55 and the wheel 57.

Rotation of the pinion 55 will effect rotation of the cage 52 and with it the platform 53, the guides 37 and the plate 32 and therefore also the image formed by the slits in the plate. Thus movement of the shaft 56 under the control of the operator will effect rotational movement in azimuth on the radar display tube 10 of the image projected from the projector device through the medium of the mirror 35. Such movement will also be transmitted to the synchro 13 through the medium of the wheels 57 and 58 thus energizing the servo loop controlling the drive means 17 (FIGURE 1) to rotate the wheel 19 carrying the printing apparatus at the repeater 12.

The pinion 39 is engaged by a tooth wheel 60 driven through the medium of a differential designated 61 from a further wheel 62. The wheel 62 is engaged through the medium of a toothed sleeve 63 by a pinion 64 carried on a shaft 65. A wheel 66 is also carried on the shaft 65 and is arranged to drive the range synchro 14 through a wheel 67.

The shaft 65 can be rotated manually suitably by a milled handwheel 72 in either direction.

The differential 61 comprises a spider 80 having bevels 81 and 82 rotatably carried on its cross shaft. A bevel 83 and attached wheel 62 are freely journaled on the main shaft of the spider 80 to which the gear wheel 60 is keyed, while a bevel 84 is free to rotate relative to the main shaft. The bevel 84 carries a wheel 85 in toothed engagement through pinion 86 with the fixed central shaft 51.

The arrangement is such that the rack 38 can be moved under the control of the operator irrespective of the position in azimuth of the cage 52, while the provision of the differential 61 enables the cage 52 to be rotated to cause rotation of the image plate 32 in azimuth without moving the rack 38 relative to the guides 37, so that the range $R_1$ is held constant. The differential further provides that rotation of the cage 52 in azimuth without moving the rack 38 relative to the guides 37 will effect energizing of the range servo loop to make the minor adjustment which will be necessary at the drive means 20 for the rack 21 of the repeater 12.

Due to the curvature of the screen of the radar display tube 10, the range indications on the screen are non-linear. Thus the invention provides a range correction device 16 which modifies the behaviour of the range servo loop to ensure that the range presented at the repeater 12 will be linear.

Preferably the device 16 will incorporate at least one cam which is rotated in accordance with variation of $R_1$ to effect proportional variation of $R_2$.

Preferably also two such cams will be provided to suit two alternative scales in which both $R_1$ and $R_2$ may be presented, in which case, means will be provided whereby one or other of said cams can be selected to influence the operation of the range servo loop to effect linearity at the repeater 12 whichever scale is from time to time being employed for whichever range.

I claim:

1. Apparatus for producing position markers upon a remote plotting device which accurately follow a positioning means manually movable with respect to a radar display, comprising:
   (a) an optical system for projecting a light beam to super-impose a focused image directly upon said radar display, which display intercepts an optical axis of the system;
   (b) means under the control of said manual positioning means for selectively displacing the image upon the display by rotating the position of the image about said axis to determine an azimuth coordinate; and for further displacing the image by moving it radially with respect to the axis to determine a range coordinate;
   (c) means at the remote plotting device including means for moving position-marker means through azimuth and range coordinates;
   (d) transmitter servo means coupled to be driven by said means for displacing the image upon the display; and
   (e) follower servo means connected to follow said transmitter-servo means, and coupled to drive said means for moving said position-marker means.

2. In apparatus as set forth in claim 1, a half-silvered mirror inclined across said radar display through which the latter can be viewed, and said optical system being disposed to impinge said image upon the display by reflection from said mirror.

3. In apparatus as set forth in claim 1, said optical system including a light source for emitting a light beam, an opaque plate disposed across said light beam and having transparent areas shaped to form said image, said areas being in the form of an interrupted line having T-shaped right-angle lines located to define the interruption.

4. In apparatus as set forth in claim 3, guide means slidably supporting said opaque plate with said interrupted line extending radially from said axis; rack and pinion means for sliding the plate to displace said interruption of the line in a radial direction; and means for rotating the said guide means about the axis.

5. In apparatus as set forth in claim 4, said transmitter servo means including separate servo means respectively connected by separate gearing with the radial and the rotational image displacing means.

(References on following page)

References Cited

UNITED STATES PATENTS

| | | | |
|---|---|---|---|
| 2,470,912 | 5/1949 | Best et al. | 88—1 X |
| 2,528,142 | 10/1950 | Herzlinger | 178—7.83 X |
| 3,072,908 | 1/1963 | Parrish | 346—8 |
| 3,091,035 | 5/1963 | Kuhlenkamp | 88—1 X |

JEWELL H. PEDERSEN, *Primary Examiner*

F. L. EVANS, *Assistant Examiner.*

U.S. Cl. X.R.

178—7.87, 7.88

UNITED STATES PATENT OFFICE
CERTIFICATE OF CORRECTION

Patent No. 3,424,751                                              January 28, 1969

Richard M. Scribner

It is certified that error appears in the above identified patent and that said Letters Patent are hereby corrected as shown below:

Column 1, lines 20 to 25, that portion of the formula reading:

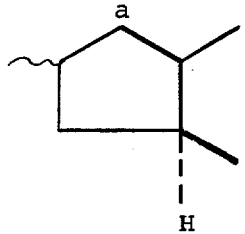          should read          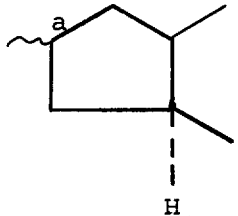

Column 13, line 28, before "is hydrogen" insert -- $R^1$ --. Column 14, line 30, "v" should read -- q --.

Signed and sealed this 14th day of April 1970.

(SEAL)
Attest:

EDWARD M. FLETCHER, JR.                           WILLIAM E. SCHUYLER, JR.
Attesting Officer                                 Commissioner of Patents